United States Patent
Schroeder

(10) Patent No.: US 6,498,482 B2
(45) Date of Patent: Dec. 24, 2002

(54) MAGNETORESISTOR DIE COMPOSED OF TWO REFERENCE MANGETORESISTORS AND A LINEAR DISPLACEMENT SENSING MAGNETORESISTOR

(75) Inventor: Thaddeus Schroeder, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/764,566

(22) Filed: Jan. 18, 2001

(65) Prior Publication Data

US 2002/0093329 A1 Jul. 18, 2002

(51) Int. Cl.[7] .................................................. S01B 7/14
(52) U.S. Cl. .............................. 324/207.21; 324/207.24
(58) Field of Search ....................... 324/207.25, 207.21, 324/207.22, 207.24, 252, 235, 225, 207.12, 173, 174; 338/32 R

(56) References Cited

U.S. PATENT DOCUMENTS

| | | | |
|---|---|---|---|
| 4,835,467 A | 5/1989 | Gokhale | 324/166 |
| 5,153,557 A * | 10/1992 | Partin et al. | 338/32 R |
| 5,184,106 A | 2/1993 | Partin et al. | 338/32 R |
| 5,327,077 A * | 7/1994 | Honda | 324/207.21 |
| 5,351,003 A | 9/1994 | Bauer et al. | 324/207.12 |
| 5,404,102 A | 4/1995 | Gokhale et al. | 324/252 |
| 5,491,461 A | 2/1996 | Partin et al. | 338/32 R |
| 5,570,016 A | 10/1996 | Schroeder et al. | 324/207.25 |
| 5,585,719 A * | 12/1996 | Endo et al. | 324/235 |
| 5,731,702 A | 3/1998 | Schroeder et al. | 324/207.21 |
| 5,754,042 A | 5/1998 | Schroeder et al. | 324/207.25 |

* cited by examiner

Primary Examiner—Edward Lefkowitz
Assistant Examiner—Subhash Zaveri
(74) Attorney, Agent, or Firm—Margaret A. Dobrowitsky

(57) ABSTRACT

A single die MR sensor having three MR elements each being preferably composed of a number of serially connected MR segments for use in linear position sensing schemes. The MR sensor is, generally, aligned in the direction of movement of a magnetic target. The middle MR element is the actual position sensor. The two outer MR elements serve as reference sensors which sense the magnetic field at the limits of the position sensing range. The cooperating magnetic target assures that one of the two outer MR elements is always exposed to some maximum magnetic field, $B_{MAX}$, corresponding to a position $X_{MAX}$, and the other MR element is always exposed to some minimum magnetic field, $B_{MIN}$, corresponding to a position $X_{MIN}$, and wherein a portion of the middle MR element is exposed to $B_{MAX}$ and another portion of the middle MR element is exposed to $B_{MIN}$, wherein the position, X, of the target is computed assuming uniformity of the middle MR element along its length.

13 Claims, 4 Drawing Sheets

MAGNETORESISTOR DIE COMPOSED OF TWO REFERENCE MANGETORESISTORS AND A LINEAR DISPLACEMENT SENSING MAGNETORESISTOR

TECHNICAL FIELD

The present invention relates to magnetoresistor devices used for magnetic position sensors.

BACKGROUND OF THE INVENTION

The use of magnetoresistors (MRs) and Hall devices as position sensors is well known in the art. For example, a magnetically biased differential MR sensor may be used to sense angular position of a rotating toothed wheel, as for example exemplified by U.S. Pat. Nos. 4,835,467, 5,731,702, and 5,74,042.

In such applications, the magnetoresistor (MR) is biased with a magnetic field and electrically excited. typically. with a constant current source or a constant voltage source. A magnetic (i.e., ferromagnetic) object moving relative and in close proximity to the MR, such as a toothed wheel, produces a varying magnetic flux density through the MR, which, in turn, varies the resistance of the MR. The MR will have a higher magnetic flux density and a higher resistance when a tooth of the moving target wheel is adjacent to the MR than when a slot of the moving target wheel is adjacent to the MR.

Increasingly more sophisticated spark timing and emission controls introduced the need for crankshaft sensors capable of providing precise position information during cranking. Various combinations of magnetoresistors and single and dual track toothed or slotted wheels (also known as encoder wheels and target wheels) have been used to obtain this information (see for example U.S. Pat. Nos. 5,570,016, 5,731,702, and 5,754,042).

The shortcoming of MR devices is their temperature sensitivity. They have a negative temperature coefficient of resistance and their resistance can drop as much as 50% when heated to 180 degrees Celsius. Generally, this led to the use of MR devices in matched pairs for temperature compensation. Additionally, it is preferable to drive MR devices with current sources since, with the same available power supply, the output signal is nearly doubled in comparison with a constant voltage source.

To compensate for the MR resistance drop at higher temperatures, and thus, the magnitude decrease of the output signal resulting in decreased sensitivity of the MR device, it is also desirable to make the current of the current source automatically increase with the MR temperature increase. This is shown in U.S. Pat. No. 5,404,102 in which an active feedback circuit automatically adjusts the current of the current source in response to temperature variations of the MR device. It is also known that air gap variations between the MR device and ferromagnetic materials or objects will affect the resistance of MR devices with larger air gaps producing less resistance and decreased output signals.

Single element magnetic field sensors composed of, for example, an indium antimonide or indium arsenide epitaxial film strip supported on, for example, a monocrystalline elemental semiconductor substrate, are also known. The indium antimonide or indium arsenide film is, for example, either directly on the elemental semiconductor substrate or on an intermediate film that has a higher resistivity than that of silicon. A conductive contact is located at either end of the epitaxial film, and a plurality of metallic (gold) shorting bars are on, and regularly spaced along, the epitaxial film. Examples thereof are exemplified by U.S. Pat. Nos. 5,153,557, 5,184,106 and 5,491,461.

Many kinds of measurements cannot be performed with common magnetic sensors comprising a single sensing element. However, compound semiconductor MRs, such as those manufactured from InSb, InAs, etc. are simply two-terminal resistors with a high magnetic sensitivity and, thus, are very suitable for the construction of single die MR sensors (in most cases one terminal of all the MR elements can be common).

Ultimately, such MR sensors could be integrated on the same die with appropriate processing circuitry. For example, if the MR array was fabricated on a Si substrate then the processing circuitry would be also Si based. For higher operating temperatures, silicon-on-insulator (SOI) could be used. A potentially lower cost alternative to the SOI approach would be to take advantage of the fact that MRs are currently fabricated on GaAs, a high temperature semiconductor, and thus, to fabricate the integrated processing circuitry from GaAs (or related InP) using HBT (Heterojunction Bipolar Tiansistor) or HEMT (High Electron Mobility Transistor) structures. This technology is now easily available and inexpensive through the explosive growth of the cellular phone industry.

Accordingly, what remains needed is a compact and inexpensive die having three magnetic sensing elements and configured to provide a linear position sensor capable of self compensation over wide ranges of temperature and air gaps, including tilts.

SUMMARY OF THE INVENTION

The present invention is a compact and inexpensive single die having three MR elements, wherein each MR element thereof is preferably composed of a number of serially connected MR segments.

The present invention is a magnetoresistor linear position sensor incorporated on a single die capable of self compensation over wide temperature ranges and air gaps, including tilts. It employs three MR elements with (preferably) one common bias magnet. The MR sensor is, generally, aligned in the direction of movement of a magnetic target. The middle MR element is the actual linear position sensor. The two outer MR elements serve as reference sensors which sense the magnetic field at the limits of the position sensing range. The cooperating magnetic target assures that one of the two outer MR elements is always exposed to some maximum magnetic field, $B_{MAX}$, corresponding to a position $X_{MAX}$, and the other outer MR element is always exposed to some minimum magnetic field, $B_{MIN}$, corresponding to a position $X_{MIN}$, and wherein the middle MR element has a portion exposed to $B_{MAX}$ and another portion exposed to $B_{MIN}$ wherein the relative proportion of the portions vary with the position, X, of the target. The effective resistance of the second MR element is proportional to the linear position of the target. Thus, the present invention provides an MR sensor composed of three MR elements for sensing linear displacement of a selected target.

According to a preferred method of fabrication, an indium antimonide epitaxial film is formed, then masked and etched to thereby provide epitaxial mesas characterizing the MR elements. Shorting bars, preferably of gold, are thereupon deposited, wherein the epitaxial mesa not covered by the shorting bars provides the MR segments. The techniques for fabricating epitaxial mesas with shorting bars are elaborated in U.S. Pat. No. 5,153,557, issued Oct. 6, 1992. U.S. Pat. No. 5,184,106, issued Feb. 2, 1993 and U.S. Pat. No. 5,491,461, issued Feb. 13, 1996, each of which being hereby incorporated herein by reference.

Accordingly, it is an object of the present invention to provide an MR die comprising three MR elements capable of detecting one-dimensional position of a magnetic target along an alignment axis of the MR elements.

This and additional objects, features and advantages of the present invention will become clearer from the following specification of a preferred embodiment.

DETAILED DESCRIPTION OF THE PREFERRED EMBODIMENT

Figure 1:
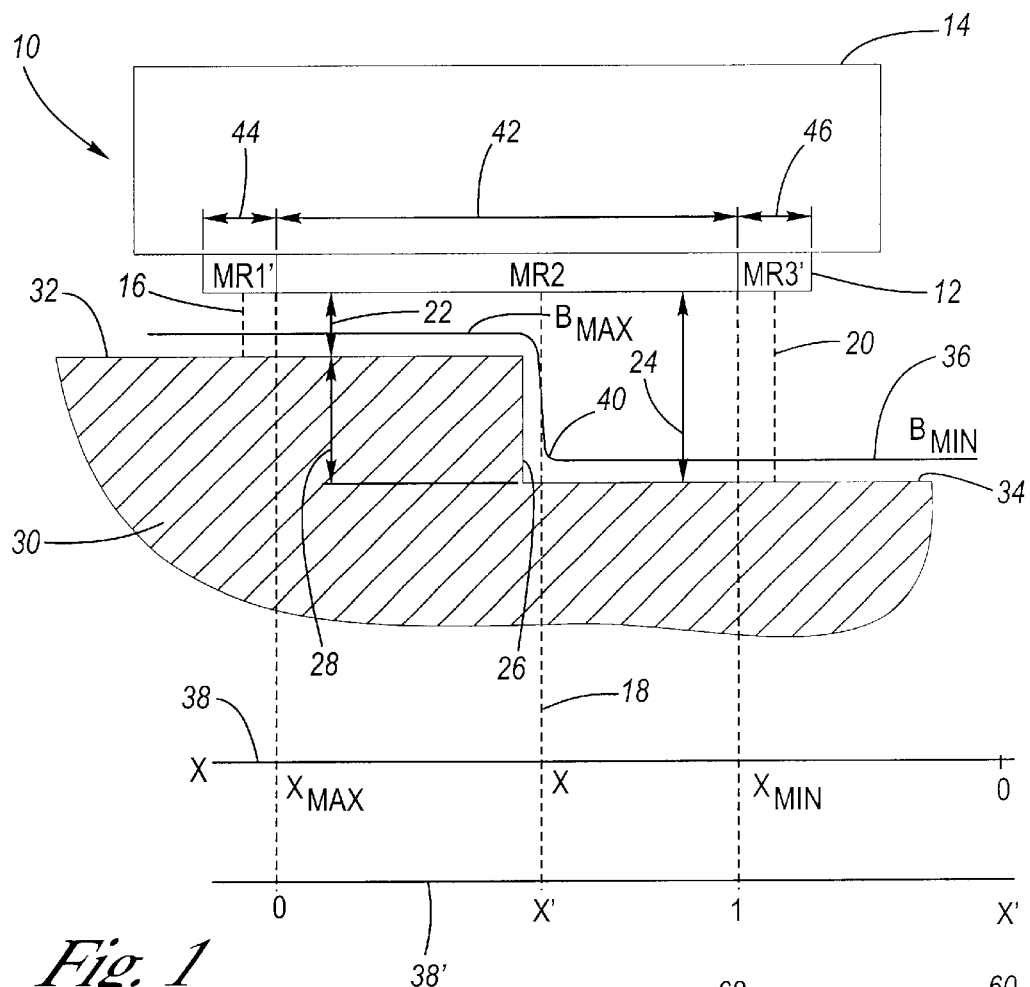
FIG. 1 depicts an example of the preferred environment of use of the present invention.

FIG. 1 depicts an example of the preferred environment of use of the present invention. The MR sensor 10, preferably stationary, employs an MR die 12 comprised of three magnetoresistor elements, MR1', MR2, and MR3', which are biased by a permanent magnet 14, wherein the magnetic flux 16, 18, and 20 emanating therefrom are represented by the dashed arrows. The magnetic flux 16, 18, and 20 pass from the permanent magnet 14 through the magnetoresistors MR1', MR2, and MR3' and through the air gaps 22 and 24 to the target 30. The length of the air gap 22 is typically, 0.1 to 0.2 mm for a minimum tooth height 28 of, approximately, 0.5 mm wherein the range ($X_{MAX}-X_{MIN}$) corresponds, preferably, to the length 42 on the order of 1 to 3 mm of MR2.

The target 30 is made of a magnetic material, having, in this example, a tooth 32, tooth edge 26, and a space 34, and is designed through the use of the small air gap 22 and tooth height 28 to have a steep slope 40 to the magnetic field profile 36 thereby approximating a step function at the tooth edge 26 which is conveyed with the target as the target moves. The target 30 may have other configurations besides that shown in FIG. 1 and may be appropriately shaped to provide any desirable magnetic field profile similar to the magnetic field profile 36. The target 30 moves in the X direction 38 and is constrained to move in a known range having a maximum value $X_{MAX}$ and a minimum value $X_{MIN}$ wherein the range ($X_{MAX}-X_{MIN}$) corresponds, preferably, to the length 42 of MR2. The magnetic profile 36 and the range of movement of the target between $X_{MAX}$ and $X_{MIN}$ ensure that MR1' is always exposed to $B_{MAX}$ and MR3' is always exposed to $B_{MIN}$ whereas the portion of MR2 between $X_{MAX}$ and X is exposed to $B_{MAX}$ and the portion of MR2 between $X_{MIN}$ and X is exposed to $B_{MIN}$ where X designates, in this example, the relative position of the tooth edge 26 with respect to the length 42 of MR2 and ($X_{MAX}-X$) designates the length of MR2 exposed to the magnetic field $B_{MAX}$ (i.e. the effective length of MR2). If the range ($X_{MAX}-X_{MIN}$) corresponds to the length 42 of MR2, a simpler coordinate system 38' may be chosen which is normalized to the length of MR2 wherein the origin is taken at $X_{MAX}$. In this case, X' designates the relative position of the tooth edge 26 with respect to the length 42 of MR2 as well as the fraction of the length of MR2 exposed to the magnetic field $B_{MAX}$ (i.e. the effective length of MR2 is X') wherein the value of X' is less than one.

Figure 2A:
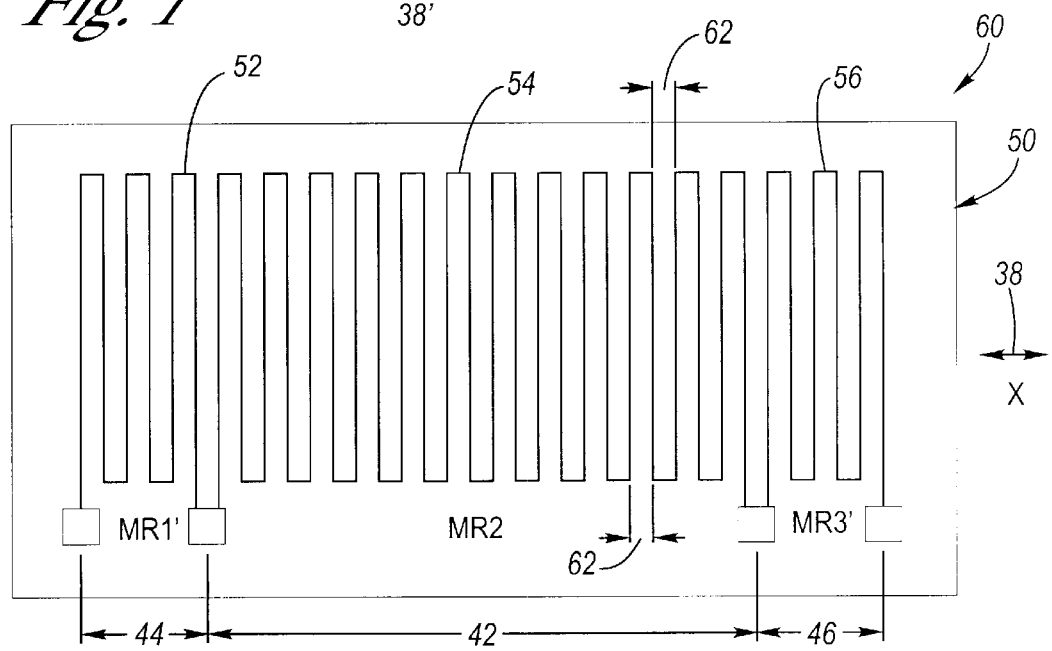
FIG. 2A is a schematic representation of a single die MR sensor according to the present invention.

FIG. 2A is a schematic representation of a single die 60 MR sensor 50 according to the present invention. The MR sensor 50 consists of three serpentinely configured MR elements 52, 54, and 56 representing MR1', MR2, and MR3', respectively, wherein the lengths 44 and 46 are, preferably but not necessarily, the same with equal spacing 62. The contact pads may be separated for each of the MR elements, or may be combined (as depicted) between MR elements 52 and 54 and between MR elements 54 and 56.

Since MR1' and MR3' only serve to provide reference values for the computation of X, the resistance of MR1', proportional to the length 44, and the resistance of MR3', proportional to the length 46, can be a small fixed portion of the resistance of MR2, proportional to the length 42, in order to save die 60 area and allocate most of the die area to MR2 which does the actual position sensing. For example, if MR1' and MR2 (elements 52 and 54) are exposed to the maximum magnetic field $B_{MAX}$, the resistance of MR1' is chosen to be $k*R_{MR2MAX}$ and if MR2 and MR3' (elements 54 and 56) are exposed to the minimum magnetic field $B_{MIN}$, the resistance of MR3' is chosen to be $p*R_{MR2MIN}$ where k and p are constant coefficients whose values are, preferably, less than one and k may be equal to p wherein $R_{MR2MAX}$ is the maximum resistance of MR2 and $R_{MR2MIN}$ is the minimum resistance of MR2. If the values of k and p are both one, then the resistance of MR1', $R_{MR1'}$, would be $R_{MR2MAX}$ and could be designated simply as $R_{MR1}$ whereas the resistance of MR3', $RMR_{3'}$, would be $R_{MR2MIN}$ and could be designated simply as $R_{MR3}$. The use of a single die 60 for the MR elements 52, 54, and 56 ensures that the sensing elements have matched thermal and magnetic sensitivities.

Figure 2B:
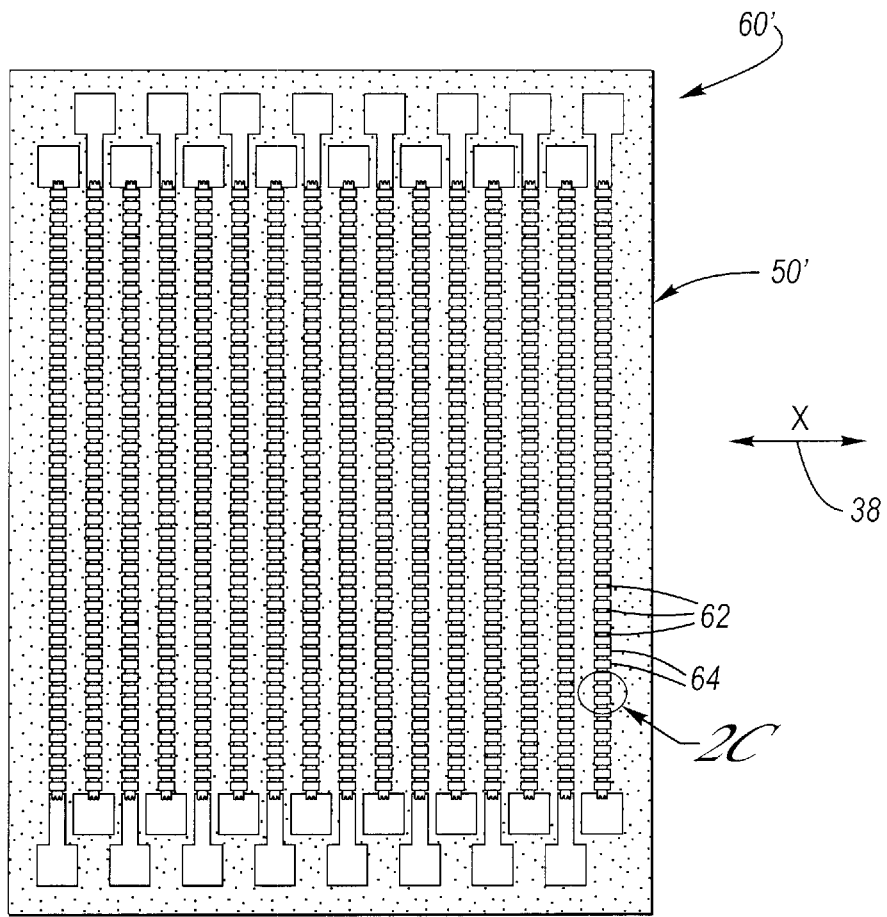
FIG. 2B is a detailed depiction of a single die composed of multiple MR elements according to the present invention.
Figure 2C:
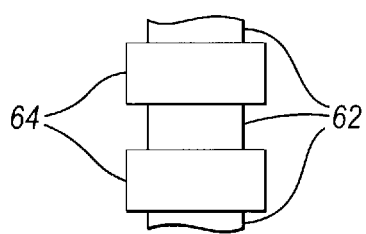
FIG. 2C is a detail view of an MR element, seen at circle 2C of FIG. 2B.

For purposes of exemplification, FIGS. 2B and 2C show details of an MR die 60' composed of and MR sensor 50'. Structurally, the MR die 60' consists of a plurality of MR elements wherein each MR element is composed of a number of MR segments 62 demarcated by uniform shorting bars 64 which are, preferably, gold. The MR segments 62 are each uniformly matched to the others (that is, the MR segments are identical).

By way of preferred example, each MR segment 62 is composed of indium antimonide (InSb) epitaxiail film mesas. Each epitaxial film mesa is provided, by way of preferred example. by forming an indium antimonide epitaxial film, then masking and etching it. The shorting bars 64, which demarcate the MR segments 62, are composed of gold bars deposited upon the MR segments. Bonding pads (or terminals) 66, preferably also of gold, are provided, in this example, for every MR element.

Referring back to FIG. 1, using the coordinate system 38' the resistance of MR2, $R_{MR2}$, can be expressed as:

$$R_{MR2}=R_{2MAX}+R_{2MIN} \qquad (1)$$

where $R_{2MAX}$ is the resistance of the portion of MR2 exposed to $B_{MAX}$ and $R_{2MIN}$ is the resistance of the portion of MR2 exposed to $B_{MIN}$. Due to the steep slope 40 of the magnetic profile 36, $R_{2MAX}=X'*R_{MR2MAX}$ and $R_{2MIN}=(1-X')*R_{MR2MIN}$ by which equation (1) can be written as:

$$R_{MR2}=X'*R_{MR2MAX}+(1-X')*R_{MR2MIN}, \quad (2)$$

Using $R_{MR1'}=k*R_{MR2MAX}$ and $R_{MR3'}=p*R_{MR2MIN}$, the position X' in equation (2) can be expressed as:

$$X'=(R_{MR2}-R_{MR3'}/p)/(R_{MR1'}k-R_{MR3'}/p) \quad (3)$$

or $$X'=(R_{MR2}-R_{MR3})/(R_{MR1}-R_{MR3}) \quad (4)$$

wherein the variables have been previously defined.

Figure 3:
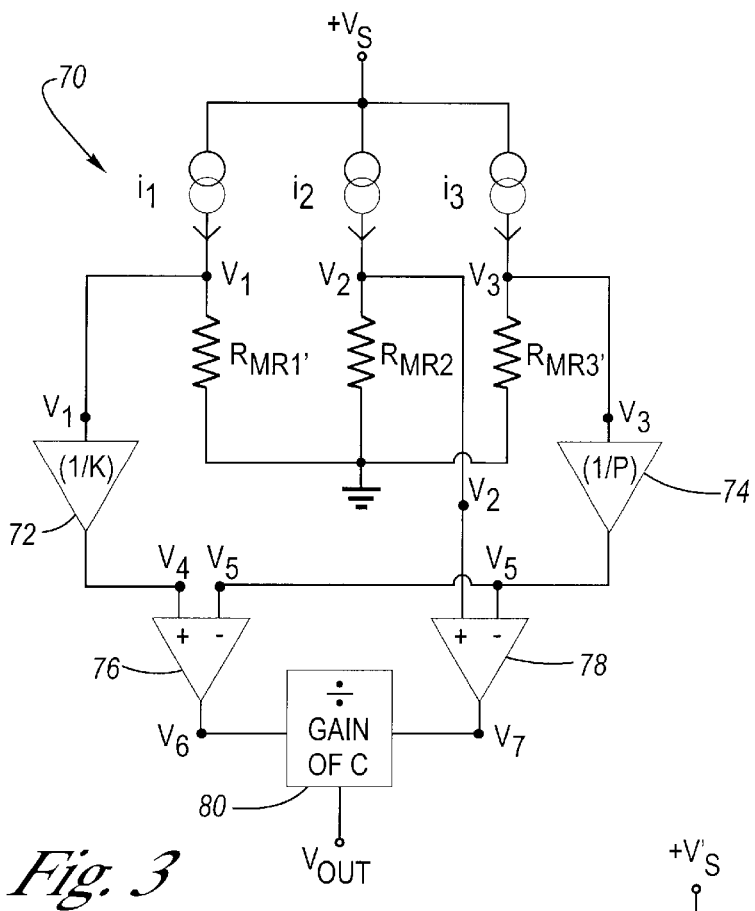
FIG. 3 shows a first example of an analog circuit implementing the present invention.

FIG. 3 shows a first example of an analog circuit 70 implementing the present invention. $V_S$ is the power supply voltage and $i_1$, $i_2$, and $i_3$ are matched constant current sources such that $i_1=i_2=i_3$. $V_1$, $V_2$, and $V_3$ are given by:

$$V_1=i_1*R_{MR1'} \quad (5)$$

$$V_2=i_2*R_{MR2} \quad (6)$$

and $$V_3=i_3*R_{MR3'}. \quad (7)$$

The output $V_4$ of amplifier 72 (i.e. an OP-AMP) having a gain of (1/k) and the output $V_5$ of amplifier 74 (i.e. an OP-AMP) having a gain of (1/p) are given by:

$$V_4=V_1/k=i_1*R_{MR1'}/k \quad (8)$$

and $$V_5=V_3/p=i_3*R_{MR3'}/p. \quad (9)$$

The output $V_6$ of differential amplifier 76 (i.e. an OP AMP) and the output $V_7$ of differential amplifier 78 (i.e. an OP AMP) are given by:

$$V_6=V_4-V_5=V_1/k-V_3/p=i_1*R_{MR1'}/k-i_3*R_{MR3'}p \quad (10)$$

and $$V_7=V_2-V_5=V_2-V_3/p=I_2*R_{MR2}-i_3*R_{MR3'}/p \quad (11)$$

whereby the output $V_{OUT}$ of analog divider 80 is:

$$V_{OUT}=C*(V_7/V_6)=C*(i_2*R_{MR2}-i_3,*R_{MR3'}/p)/(i_1*R_{MR1'}/k-i_3*R_{MR3'}/p) \quad (12)$$

or, since $i_1=i_2=i_3$, $$V_{OUT}=C*(R_{MR2}-R_{MR3'}/p)/(R_{MR1'}/k-R_{MR3'}/p)=C*(R_{MR2}-RMR_3)/(R_{MR1}-R_{MR3}) \quad (13)$$

where C is the gain of analog divider 80 and is adjusted for maximum sensitivity or C is adjusted to satisfy other system requirements. For example C may be adjusted such that $V_{OUT}$ has a value of zero when MR2 is at the position $X_{MIN}$ and a value of 5 volts when MR2 is at the position $X_{MAX}$. Hence, $$(RMR_2-R_{MR3'}/p)/(R_{MR1'}/k-R_{MR3'}/p)=(R_2-R_3)/(R_1-R_3)=V_{OUT}/C \quad (14)$$

and equations (3) and (4) may be expressed as:

$$X'V_{OUT}/C \quad (15)$$

Thus, since the gain C is known, the position X' can be determined from the voltage $V_{OUT}$ from which the position X of coordinate system 38 of FIG. 1 can be ascertained.

Figure 4:
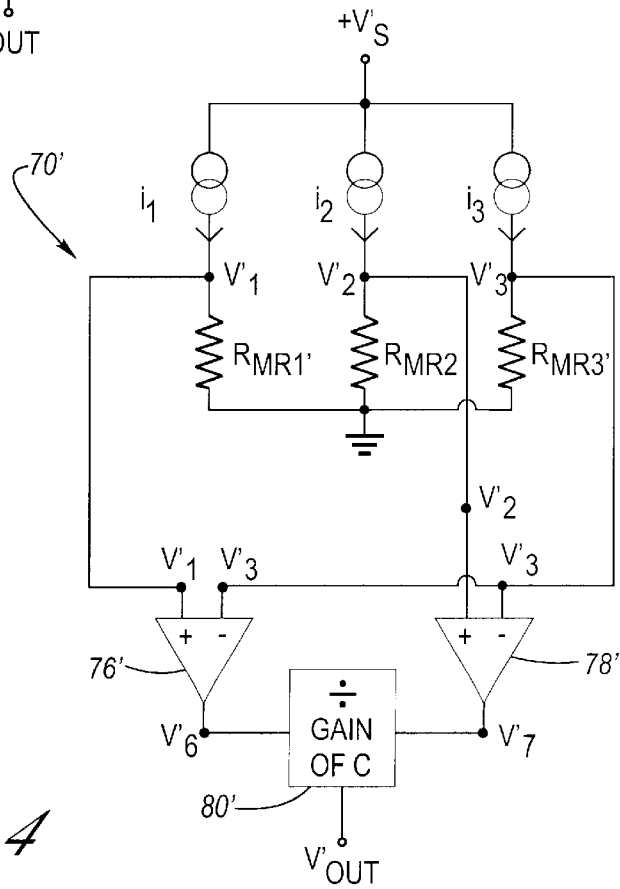
FIG. 4 shows a second example of an analog circuit implementing the present invention.

FIG. 4 shows a second example of an analog circuit 70' well suited for the integration on the MR die 60 implementing the present invention. $V'_S$ is the power supply voltage and $i'_1$, $i'_2$, and $i'_3$ are weighted constant current sources such that $i'_1=i'_2/k$ and $i'_3=i'_2/p$. $V'_1$, $V'_2$, and $V'_3$ are given by:

$$V'_1=i'_1*R_{MR1'}=(i'_2K)*R_{MR1'} \quad (6)$$

$$V'_2=i'_2*R_{MR2} \quad (17)$$

and $$V'_3=i'_3*R_{MR3'}=(i'_2/p)*R_{MR3'}. \quad (18)$$

The output $V'_6$ of differential amplifier 76' (i.e. an OP AMP) and the output $V'_7$ of differential amplifier 78' (i.e. an OP AMP) are given by:

$$V'_6=V'_1-V'_3=(i'_2/k)*R_{MR1'}-(i'_2/p)*R_{MR3'} \quad (19)$$

and $$V'_7=V'_2-V'_3=i'_2*R_{MR2}-(i'_2/p)*R_{MR3'} \quad (20)$$

whereby the output $V'_{OUT}$ of analog divider 80' is:

$$V'_{OUT}C'*(R_{MR2}-R_{MR3'}/p)/(R_{MR1'}/k-R_{MR3'i/p})=C'*(R_{MR2}-RMR_3)/(R_{MR1}-R_{MR3}) \quad (21)$$

where C is the gain of analog divider 80' and is adjusted for maximum sensitivity or C' is adjusted to satisfy other system requirements. For example, C' may be adjusted such that $V'_{OUT}$ has a value of zero when MIR is at the position $X_{MIN}$ and a value of 5 volts when MR2 is at the position $X_{MAX}$. Hence.

$$(R_{MR2}-R_{MR3'}/p)/(R_{MR1'}/k-R_{MR3'}/p)=(R_2-R_3)/(R_1R_3)=V'_{OUT}/C \quad (22)$$

and equations (3) and (4) may be expressed as:

$$X'=V'_{OUT}/C' \quad (23)$$

Thus, since the gain C' is known, the position X' can be determined from the voltage $V'_{OUT}$ from which the position X of coordinate system 38 of FIG. 1 can be ascertained.

Figure 5:
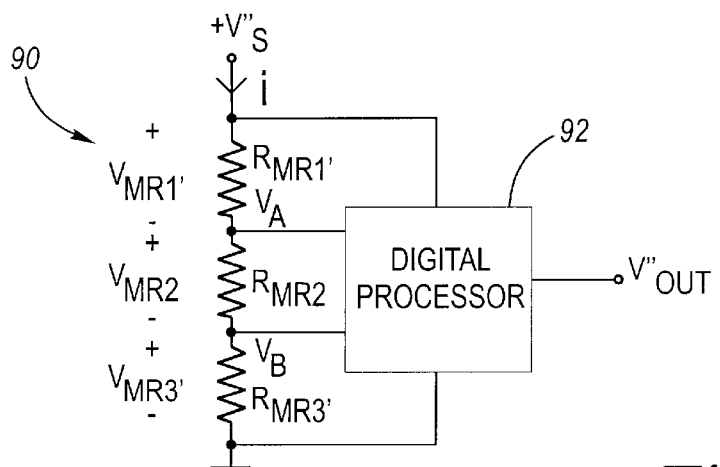
FIG. 5 shows an example of a circuit employing a digital processor implementing the present invention.

FIG. 5 shows an example of a circuit 90 employing a digital processor 92 i.e. digital signal processor, micro controller, microprocessor, etc.) implementing the present invention. $V''_S$ is the value of the supply voltage and is implicitly known to the digital processor 92, for example, as an input or stored in the digital processor's memory. The position range $X_{MIN}$, and $X_{MAX}$ as well as the parameters p and k are, preferably, stored in memory also. The values of $V_A$ and $V_B$ are input to the digital processor 92 and can be expressed as:

$$V_AV''_S*(R_{MR2}R_{MR3}')/(R_{MR1'}+R_{MR2}+R_{MR3}') \quad (24)$$

and $$V_B=V''_S*R_{MR3'}/(R_{MR1'}+R_{RMR2}+R_{MR3'}). \quad (25)$$

$V_{MR1}$, $V_{MR2}$, and $V_{MR3}$ are the values of the voltages across MR1', MR2, and MR3', respectively, whereas i is the current through MR1', MR2, and MR3', and can be expressed as:

$$V_{MR1'}=V''_S-V_Ai*R_{MR1'} \quad (26)$$

$$V_{MR2}=V_A=i*R_{MR2}) \quad (27)$$

and $$V_{MR3'}=V_B=i*R_{MR3'} \quad (28)$$

The value of the output $V''_{OUT}$ is computed by the digital processor 92 and can be expressed as:

$$V''_{OUT}=C''*(V_{MR2}-V_{MR3'}/p)/(V_{MR1'}/k-V_{MR3'}/p) \qquad (29)$$

or from equations (26), (27), and (28)

$$V''_{OUT}=C''*(R_{MR2}-R_{MR3'}/p)/(R_{MR1'}/k-R_{MR3'}/p) \qquad (30)$$

wherein C" is the gain and is adjusted for maximum sensitivity or C" is adjusted to satisfy other system requirements. For example, C" may be adjusted such that $V''_{OUT}$ has a value of zero when MR2 is at the position $X_{MIN}$ and a value of 5 volts when MR2 is at the position $X_{MAX}$. Hence.

$$(R_{MR2}-R_{MR3'}/p)/(R_{MR1'}/k-R_{MR3'}/p)=(R_2-R_3)/(R_1-R_3)=V''_{OUT}/C'' \qquad (31)$$

and equations (3) and (4) may be expressed as:

$$X'=V''_{OUT}/C'' \qquad (32)$$

Thus, since the gain C" is known, the position X' can be determined from the voltage $V''_{OUT}$ from which the position X of coordinate system 38 of FIG. 1 can be ascertained.

Figure 6:
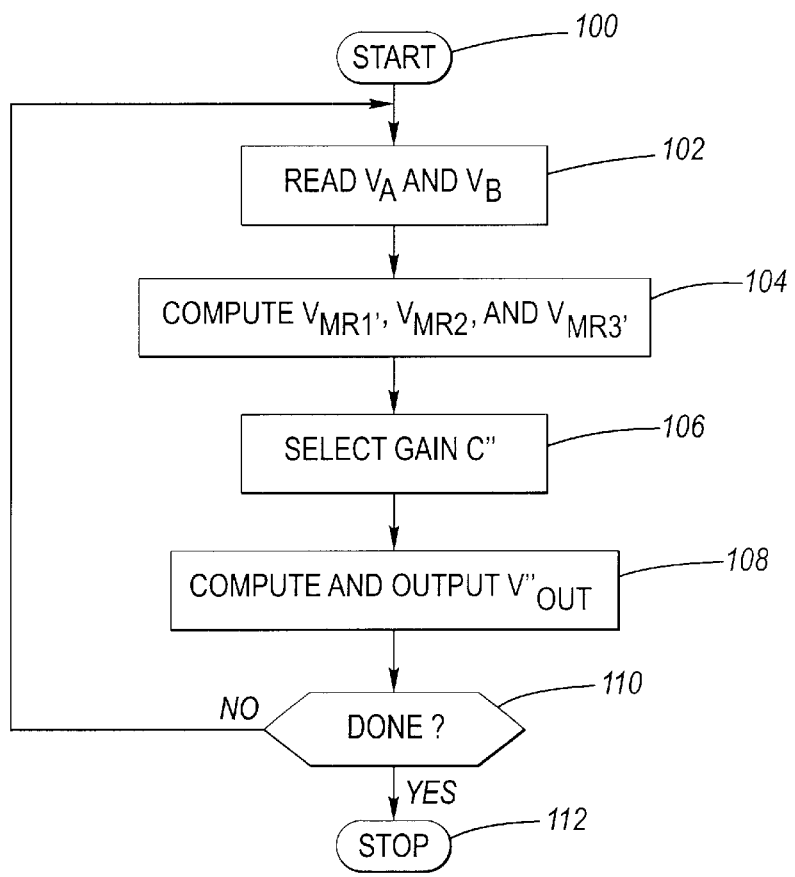
FIG. 6 is a flow diagram for the digital processor of FIG. 5.

FIG. 6 is a flow diagram for the digital processor 92 of FIG. 5. The procedure starts at block 100 where initialization of the digital processor 92 is accomplished. At block 102 the values of $V_A$ and $V_B$ are entered into the digital processor 92 and the values of $V_{MR1'}$, $V_{MR2}$, and $V_{MR3'}$ are computed at block 104 according to equations (26), (27), and (28). The gain C" is selected at block 106 and the output voltage $V''_{OUT}$ is computed and output at block 108. $V'_{OUT}$ is computed according to equation (29) using the stored values of k and p. If at (optional) decision block 110 the procedure is not done, then control passes to block 102. Otherwise the procedure ends at block 112. If desired. the value of X' may be computed according to equation (32) and output as well. The method of accomplishing this would involve another computation block being implemented in FIG. 6 and is well known to those skilled in the art.

To those skilled in the art to which this invention appertains, the above described preferred embodiment may be subject to change or modification. Such change or modification call be carried out without departing from the scope of the invention, which is intended to be limited only by the scope of the appended claims.

What is claimed is:

1. A sensor system comprising:
   a single die magnetoresistor sensor comprising:
      a first magnetoresistor element;
      a second magnetoresistor element having a first end and an opposite second end; and
      a third magnetoresistor element, wherein said first, second and third magnetoresistor elements are mutually arranged along an axis, said second magnetoresistor element being located between said first and third magnetoresistor elements;
   a bias magnetic field; and
   a magnetic target having a predetermined magnetic irregularity, wherein said target is movable adjacent said first, second and third magnetoresistor elements along said axis between a predetermined maximum position and a predetermined minimum position such that the bias magnetic field and magnetic irregularity mutually always provide a maximum magnetic field value at said first magnetoresistor element and provide a minimum magnetic field value at said third magnetoresistor element.

2. The sensor system of claim 1, wherein each magentoresistor element comprises a plurality of uniformly arranged and serially connected magnetorsistor segments.

3. The sensor system of claim 2, wherein said first end of said second magnetoresistor element is adjacent said first magnetoresistor element and said second end of said second magnetoresistor element is adjacent said third magnetoresistor element.

4. The sensor system of claim 3, wherein said second magnetoresistor element is substantially uniform between said first and second ends thereof.

5. The sensor system of claim 4, wherein position of said target relative to said second magnetoresistor along said axis is defined by:

$$X=(R_{MR2}-R_{MR3'}/p)/(R_{MR1'}/k-R_{MR3'}/p),$$

wherein X is the position of the irregularity relative to the second magnetoresistor, $R_{MR1'}$ is a resistance of the first magnetoresistor, $R_{MR2}$ is a resistance of the second magnetoresistor, $R_{MR3'}$ is a resistance of the third magnetoresistor, and k and p are predetermined constant coefficients.

6. The sensor system of claim 5, wherein said magnetic irregularity is a tooth edge.

7. The sensor system of claim 5, further comprising an electrical circuit connected with said first, second and third magnetoresistor elements for providing a voltage across said first, second and third magnetoresistor elements which is responsive to the position of said target.

8. The sensor system of claim 7, wherein said circuit provides a voltage output of $V_{OUT}$, wherein the electrical circuit comprises a source of voltage, a plurality of amplifiers connected with said first, second and third magnetoresistors, said plurality of amplifiers including an analog amplifier having a gain of C, wherein $$(R_{MR2}-R_{MR3'}/p)/(R_{MR1'}/k-R_{MR3'}/p)=(R_2-R_3)/(R_1-R_3)=V_{OUT}/C$$

and wherein the position has a predetermined relationship with respect to the term $V_{OUT}/C$.

9. The sensor system of claim 8, wherein said magnetic irregularity is a tooth edge.

10. The sensor system of claim 9, wherein said electrical circuit comprises a source of voltage and a digital processor connected with said first, second and third magnetoresistors wherein such that said digital processor provides a voltage output, $V_{OUT}$, responsive to the position of said target.

11. The sensor system of claim 10, wherein $$V_{OUT}=C*(V_{MR2}-V_{MR3'}/p)/(V_{MR1'}k-V_{MR3'}/p),$$

wherein C is a predetermined gain of the digital processor. and wherein the position has a predetermined relationship with respect to the term $V_{OUT}/C$.

12. The sensor system of claim 11, wherein said magnetic irregularity is a tooth edge.

13. A method for determining position of a target having a magnetic irregularity relative to a magnetic position sensor, the magnetic sensor comprising first, second, and third magnetoresistor elements sequentially arranged along an axis, wherein the second magnetoresistor element is disposed between said first and second magnetoresistor elements, wherein the target is movable adjacent the first, second and third magnetoresistor elements along the axis between a predetermined maximum position, $X_{MAX}$, and a predetermined minimum position, $X_{MIN}$, such that a bias magnetic field and the magnetic irregularity mutually always provide a maximum magnetic field value at the first magnetoresistor element and provide a minimum magnetic field value at the third magnetoresistor element, and wherein a digital processor is connected with the first, second and third magnetoresistor elements, said method comprising the steps of:

determining a first voltage between the first and second magnetoresistor elements and a second voltage between the second and third magnetoresistor elements;

computing a voltage, respectively, across each of said first, second and third magnetoresistor elements, wherein the voltage across the first mangetoresistor element, $V_{MR1}$, is equal to a source voltage minus the first voltage, the voltage across the second magnetoresistor element, $V_{MR2}$, is equal to the first voltage minus the second voltage, and the voltage across the third magnetoresistor element, $V_{MR3}$, is equal to the second voltage;

selecting a gain, C, of the digital processor;

computing an output voltage, $V_{OUT}$, wherein $V_{OUT}=C*(V_{MR2}-V_{MR3}/p)/(V_{MR1}/k-V_{MR3}/p)$, wherein p and k are predetermined constants; and computing the position, X, wherein $X=V_{OUT}/C$.

* * * * *